I. TROLLEY.
HARVESTER REEL SUPPORT.
APPLICATION FILED AUG. 25, 1916.

1,251,939.

Patented Jan. 1, 1918.
2 SHEETS—SHEET 1.

INVENTOR.
Isaac Trolley
BY
Rogers, Kennedy-Campbell
ATTORNEYS.

I. TROLLEY.
HARVESTER REEL SUPPORT.
APPLICATION FILED AUG. 25, 1916.
1,251,939.
Patented Jan. 1, 1918.
2 SHEETS—SHEET 2.
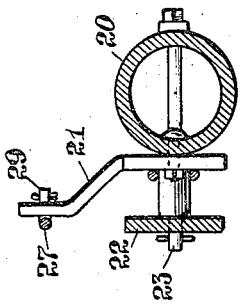
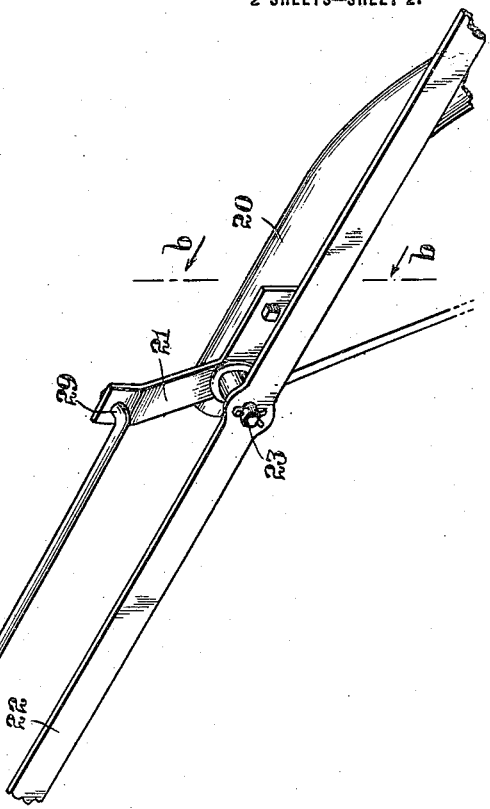
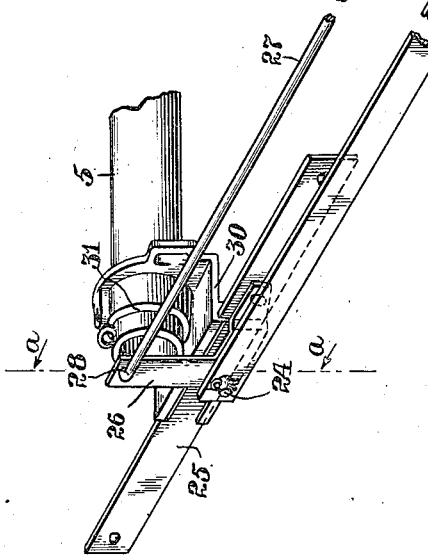
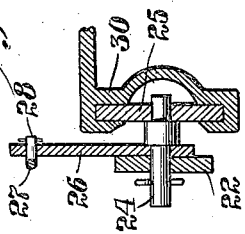
INVENTOR.
Isaac Trolley
BY
Rogers, Kennedy & Campbell
ATTORNEYS.

UNITED STATES PATENT OFFICE.

ISAAC TROLLEY, OF POUGHKEEPSIE, NEW YORK, ASSIGNOR TO MOLINE PLOW COMPANY, A CORPORATION OF ILLINOIS.

HARVESTER-REEL SUPPORT.

1,251,939.  Specification of Letters Patent.  Patented Jan. 1, 1918.

Application filed August 25, 1916. Serial No. 116,763.

*To all whom it may concern:*

Be it known that I, ISAAC TROLLEY, a citizen of the United States, residing at Poughkeepsie, in the county of Dutchess and State of New York, have invented certain new and useful Improvements in Harvester-Reel Supports, of which the following is a specification, reference being had therein to the accompanying drawing.

This invention relates to harvesting machines, and has reference more particularly to the devices which support the harvester reel to enable it to be adjusted horizontally and vertically respectively to and from the cutter bar and the grain platform in order to meet the varying conditions encountered in practice with respect to the condition and height of the standing grain.

Where a comparatively short cutter bar is employed, it is generally sufficient to support the reel at its inner or stubble end for adjustment, but when a long cutter bar is employed, requiring a correspondingly long reel shaft, it is necessary to support also the outer end of the reel in order to prevent sagging, it being customary to connect up the outer support with the inner support so that both ends of the reel shaft will be simultaneously adjusted and in like directions by a single adjusting lever associated with the inner support.

My invention is concerned with the support for the outer or grain end of the reel, and it consists of a supporting means of improved form and construction which will sustain the outer end of the reel shaft without sagging, will maintain the same at all times parallel with the cutter bar and grain platform, and will enable the reel at its outer end to follow accurately and with certainty the different adjustments imparted by the driver to its inner end.

In the accompanying drawings:

Fig. 2 is a perspective view of the outer support for the reel and the adjacent parts.

Fig. 3 is a vertical transverse section on the line *a—a* of Fig. 2.

Fig. 4 is a similar view on the line *b—b* of Fig. 2.

Figure 1:
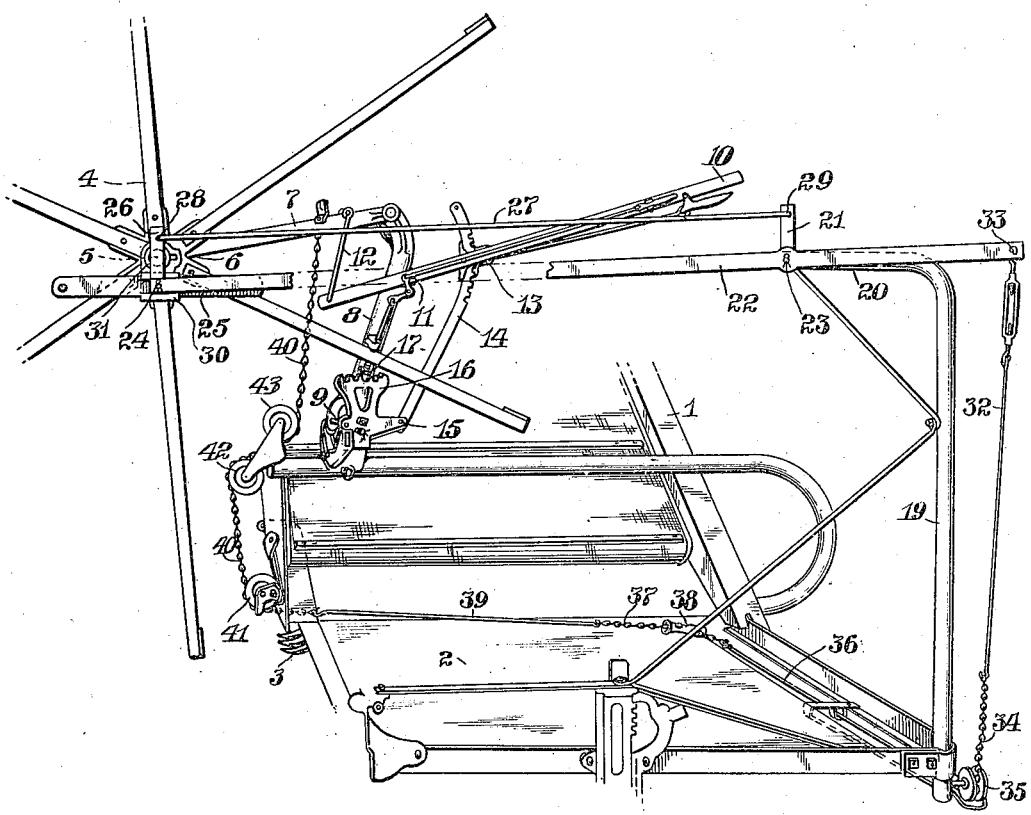
Figure 1 is a perspective view of a portion of a harvester showing the harvester reel and my improved supporting means for the outer or stubble end of the same.

Referring to the drawings:

1 indicates a portion of the harvester frame and 2 the platform frame extending in a grainward direction therefrom and provided at its forward end as usual with the cutter bar 3.

4 indicates a harvester reel provided with a horizontal reel shaft 5. The inner end of the reel shaft may be supported from the frame of the machine in any suitable and appropriate manner which will admit of its adjustments both horizontally to and from the cutter bar, and vertically to and from the grain platform, various forms of adjustable supports for this purpose being known in the art. In the present instance however, the inner end of the shaft is mounted in a bearing 6 in the forward end of a horizontal lever 7, the rear end of which is pivoted on a horizontal axis to the upper end of a vertical lever 8, which vertical lever is in turn pivoted at its lower end to the frame of the machine on a horizontal axis 9, so that by the up and down movements of the horizontal lever 7 the reel will be given its vertical adjustment, and by the horizontal movements of the vertical lever 8 the reel will be given its horizontal adjustments. These adjustments are effected and controlled by means of a single hand lever 10 pivoted between its ends as at 11 at a point between the ends of the vertical lever and connected by means of a link 12 with the horizontal lever, the hand lever being provided with a locking latch 13 adapted to engage notches in an upright bar 14 pivoted at its lower end as at 15 to an arm on a segment frame 16 fixed to the frame of the machine. The hand lever is provided with a second locking latch 17 which engages notches in the segment frame 16. The latch 17 coöperating with the segment frame 16, controls the horizontal movements of the lever 8, and the latch 13 coöperating with the notched bar 14 controls the vertical movements of the horizontal lever 7.

The construction described constitutes one form of device by means of which the driver is enabled by the single hand lever to adjust the inner end of the reel shaft both vertically and horizontally, and this device in itself forms no part of the present invention.

My invention is concerned with the support for the outer end of the reel shaft, which support is of such form, construction and arrangement, as will now be described, that the reel shaft will be effectively sustained and prevented from sagging, and in its various adjustments by the adjusting device at the inner end, it will maintain at all times a horizontal position parallel both with the cutter bar and grain platform.

As shown more particularly in Fig. 2, a rigid standard 19 is extended upwardly from the outer rear corner of the platform frame, and has its upper end extended horizontally forwardly as at 20 and its forward extremity provided with an upright arm 21 fixed firmly thereto. A long horizontal lever 22 is pivoted between its ends on a horizontal axis as at 23 to the forward end of the horizontal portion 20 of the standard at its junction with the upright arm, so that the lever may move up and down on said axis relatively to the grain platform. At its forward end the lever has pivoted to it on a horizontal axis 24, a horizontal supporting guide plate 25 from which extends upwardly in line with the axis 24, a vertical arm 26 firmly fixed to the plate, a link 27 being jointed at its forward end as at 28 to the upper end of the arm 26 and being jointed at its rear end as at 29 to the upper end of the upright arm 21, which link extends parallel with the lever 22. The several axes 23, 24, 28 and 29 are parallel to each other, the link 27 in connection with the arms 21 and 26 and the lever 22 constituting in effect a parallel movement which in the up and down movements of the lever 22 will maintain the supporting guide plate 25 at all times in a horizontal position.

Mounted on the guide plate 25, so as to slide horizontally freely thereon, is a slide 30 provided with a bearing 31 in which the outer end of the reel shaft 5 is journaled, the arrangement being such that when the inner end of the reel shaft is shifted horizontally by the adjusting hand lever 10 before alluded to, the outer end of the shaft will be correspondingly moved and the parallelism of the shaft with the finger bar will be thus maintained.

The up and down movement of the lever 22 to control the vertical adjustments of the outer end of the reel shaft is effected automatically by the corresponding adjustments of the inner end of the shaft, the rear end of the lever being operatively connected for this purpose with the horizontal lever 7 at the inner end of the reel. These connections are flexible and in the present instance are in the form of a vertical rod 32 having its upper end jointed to the rear end of the lever 22 as at 33 and having its lower end connected with a chain 34 passing around a guide pulley 35 journaled at the outer rear corner of the platform frame. The chain is connected with a horizontal rod 36 extending along the rear edge of the platform and connected at its inner end with a chain 37 passing through a guide 38 on the platform and extending thence forwardly and connected with a fore and aft extending rod 39 whose forward end is connected with a chain 40 passing over guide pulleys 41, 42 and 43 journaled on the platform frame and thence upwardly where the upper end of the chain is connected with the horizontal lever 7. As a result of this construction, when the lever 7 is shifted vertically by the adjusting hand lever 10 to elevate the inner end of the reel shaft, the flexible connections consisting of the chains and links described, will pull down on the rear end of the lever 22 and will correspondingly elevate its forward end, thereby raising the outer bearing for the reel shaft, and the outer end of the reel in unison with and to the same extent as the inner end of the reel. When the lever 7 is moved downwardly, the reverse action of the parts takes place with the result that the outer end of the reel will be correspondingly lowered.

Due to the fact that the supporting guiding plate 25, on which the outer reel bearing is supported and slides horizontally, is maintained at all times by the parallel movement in a horizontal position in the different vertical movements of the lever, the said bearing will be free to adjust itself horizontally in accordance with the horizontal adjustments of the inner end of the reel shaft. Consequently the outer end of the shaft will follow accurately and with certainty the horizontal adjustments of its inner end, and will not shift by gravity in either direction beyond its proper position, the result being that the reel will be maintained at all times in its various adjustments either horizontally or vertically, in true parallelism with the grain platform and with the cutter bar.

It is to be noted that the horizontal movement of the outer end of the reel shaft is effected wholly and solely by the corresponding movement imparted to its inner end, these movements being wholly independent of the flexible connections between the lever 22 and the adjusting mechanism at the inner end of the shaft.

In the foregoing description and accompanying drawings I have set forth my invention in the particular detailed form which I prefer to adopt and which in practice has been found to answer to a satisfactory degree the ends to be attained. It will be manifest however that various changes may be made in the details without departing from the limits of my invention provided the operation will be substantially as indicated above. Further it will be understood that the invention is not limited to any particular form or construction of the parts except in so far as such limitations are specified in the claims.

Having thus described my invention, what I claim is:

1. In a harvester, the combination of a frame, a harvester reel, an inner support for the reel adjustably sustained by the frame, an up and down movable member mounted in the frame for supporting the outer end of the reel, a horizontal supporting guide movably mounted on said member, a support for the outer end of the reel movable freely on said supporting guide, a parallel linkage operatively connected with said guide and with the frame for maintaining the horizontal position of the supporting guide in the up and down movements of said member, and operative connections between said member and said inner support.

2. In a harvester, the combination of a frame, a harvester reel provided with a reel shaft, an inner bearing in which the reel shaft is mounted, said bearing being adjustably sustained by the frame to move vertically and horizontally, an up and down movable lever pivoted to the frame for supporting the outer end of the reel shaft, a horizontal supporting guide pivoted to the lever on an axis parallel with the axis of the lever and provided with an upwardly extending arm, a slide movable freely on the supporting guide and provided with a bearing in which the outer end of the reel shaft is mounted, a link extending parallel with the lever and jointed at its ends respectively to said arm and frame, and operative connections between the lever and said inner support.

3. In a harvester, the combination of a frame, a reel provided with a reel shaft, an inner bearing in which the reel shaft is rotatably mounted, said bearing being mounted on the frame and being adjustable vertically and horizontally, an upwardly extending standard mounted on the frame and provided with an upright arm, an up and down movable lever pivoted between its ends on said standard, a horizontal supporting guide plate pivoted to the forward end of the lever on an axis parallel with the axis of the lever and provided with a vertical arm, a slide movable horizontally on said plate and having a bearing in which the outer end of the reel shaft is journaled, a link extending parallel with the lever and jointed at its ends respectively to said vertical arm and said upright arm on horizontal axes parallel with the axis of the lever, and flexible connections between the rear end of the lever and the said inner support.

In testimony whereof, I have affixed my signature in presence of two witnesses.

ISAAC TROLLEY.

Witnesses:
Wм. J. Merkle,
E. F. Huber.

Copies of this patent may be obtained for five cents each, by addressing the "Commissioner of Patents, Washington, D. C."